Patented May 31, 1932

1,861,357

UNITED STATES PATENT OFFICE

ETIENNE PERILHOU, OF LENS, FRANCE, ASSIGNOR TO SOCIETE HUILES, GOUDRONS & DERIVES, OF LENS, FRANCE

NEW PROCESS FOR EXTRACTING PHENOLS FROM PHENOLIC TAR OILS

No Drawing. Application filed September 10, 1929, Serial No. 391,697, and in France July 22, 1929.

The process forming the subject matter of this invention is applicable to tar oils, high and low temperature, as well as to wood tar oils.

It is known that the extraction of phenols contained in oils is effected by stirring the latter with an aqueous solution of caustic soda. Sodium phenate is formed according to the following equation:

$$ROH + NaOH = RONa + H_2O$$

The solution of phenate is separated by decantation from the oil freed from phenols, then treated with steam for elimination of hydrocarbons, and finally acidified with sulphuric acid or carbon dioxide for releasing the phenols.

$$RONa + R'H = ROH + R'Na$$

This extraction is always costly, particularly when the acidification is effected with sulphuric acid, as the sodium hydroxide used for extraction purposes and the sulphuric acid are definitely lost in the form of sodium sulphate which is not utilizable.

In the case of acidification by carbon dioxide, it is possible, by subjecting the sodium carbonate to the caustic action of lime, to regenerate the caustic soda. But this operation is not effected without losses; moreover, it requires high expenses for labor, steam and power, and it can be said that in the production of phenol the regeneration of soda constitutes the main element of cost.

It has been attempted by various and numerous means to provide cheaper methods of extraction of phenols; in fact, up to now no satisfactory method has been found, and, industrially, the method utilizing soda is the only one employed. The main disadvantages common to these various methods are:

(1) That the extraction of phenols is not total (phenols remain in the oils).

(2) That the phenols obtained are polluted with hydrocarbons, which can not be completely separated and render the phenols commercially useless.

The phenol extraction process forming the subject-matter of this invention does not present these inconveniences and allows to extract phenols in the same conditions of output and purity as the conventional process with soda. It has over the latter the advantage of eliminating the costly operation of regeneration of the caustic soda by means of lime.

Its principle rests on the utilization of the reversibility of the reaction of the carbonation of solutions of sodium phenate.

The reaction of the carbonation of phenate is as follows:

$$RONa + CO_2 + H_2O = ROH + NaHCO_3 \quad (1)$$

or $$2RONa + CO_2 + H_2O = 2ROH + Na_2CO_3 \quad (2)$$

The reverse reaction which is used here is the following:

$$Na_2CO_3 + 2ROH = CO_2 + H_2O + 2RONa \quad (3)$$

The reaction thus set out is not known, or is considered without possible utilization because it is immediately limited by the equilibrium which is established between its two members when operating under atmospheric pressure or under pressure in a close vessel.

The applicant has, on the other hand, found that this reaction was liable to develop until it becomes complete if it was carried out at a high temperature (above 100° C.) under pressure, by constantly allowing the carbon dioxide formed to escape. By this latter means, the reaction is allowed to permanently move in the direction sought for.

It is to be noted that the reaction 3, begins to take place at boiling point under atmospheric pressure, but its speed is then so small that it is scarcely perceptible, and this explains why this reaction has escaped observation. The speed of the reaction is accelerated by causing an inert gas (nitrogen for instance) to bubble through the mass, but not sufficiently for rendering the operation utilizable.

The reaction 3, requires the presence of water and does not take place with dry carbonate: it occurs satisfactorily as the solution of carbonate is more diluted.

It takes place with potassium carbonate as well as sodium carbonate.

This reaction produces carbon dioxide without any cost, which carbon dioxide can be used for liberating the phenols, by acidifying the produced phenate. The use of pure carbon dioxide avoids the losses caused by carrying away with the inert gases, losses which occur when acidifying with carbon dioxide gas from lime kilns.

The reaction takes place on the different phenolic bodies with a selective activity and allows, by an insufficient use of carbonate, to separate partially first for instance phenol in the state of phenate, while the cresols remain in a free state.

The commercial application of this process for freeing tar oils from phenols can be carried out in various manners two of which will be indicated by way of examples.

*Process carried out in a digester.*—The phenolic oil is heated in a digester to 170° C., with or without stirring, with a solution of sodium carbonate. The reaction 3 takes place, and the carbon dioxide which is produced is constantly evacuated through a convenient cock so that the reaction can continue until the phenol is completely transformed into phenate. The said piping is placed at the upper end of a small reflux cooler operating also under the pressure of the digester (i. e. about 7 to 8 kg.) and adapted to retrograde the condensable vapours drawn along with the carbon dioxide.

After the operation, the sodium phenate is first separated under pressure, and then the oil freed from phenol is taken out of the digester. The pressure over the separated phenate is allowed to lower, so that the latter abandons the dissolved hydrocarbons (this avoiding the expense of steam for purification purposes). If the oil is not completely freed from phenols by the first treatment, it is brought a second time into contact with a solution of fresh carbonate.

The carbon dioxide produced by the reaction serves to acidify a preceding batch of phenate: on the one hand, raw phenol is obtained and, on the other hand, a solution of sodium carbonate which immediately re-enters the cycle of manufacture.

*Process carried out in a continuous column.*—In a steel column of great height, operating on the counter current principle, filled with Raschig rings, and heated with steam to 170° C. by an axial pilot pipe, the phenolic oil is injected at the base by means of measuring pumps, whilst the solution of sodium carbonate enters at the upper part of the column under a pressure of about 8 kgs. Carbon dioxide evolves at the upper part from a small reflux cooler, the phenate is extracted at the lower part and the oil freed from phenols at the upper part.

As in the first case, the carbon dioxide serves to acidify the solutions of phenate, giving back sodium carbonate which immediately re-enters the cycle of manufacture.

All the circuits are so devised as to allow the exchange and recovery of heat.

It will be seen that the manufacture is greatly simplified and that notwithstanding the use of pressure the losses and cost of manufacture are considerably reduced.

I claim:

A process for extracting phenols contained in phenolic oils, which consists in causing a solution of an alkali metal carbonate to act on the said oils at a temperature of about 170° C., under a pressure of about 7 to 8 kg., in evacuating the carbon dioxide in proportion as it is produced and in removing the phenols in the state of phenates.

In testimony whereof I have hereunto affixed my signature.

ETIENNE PERILHOU.